(12) United States Patent
de Groote

(10) Patent No.: US 7,117,784 B2
(45) Date of Patent: Oct. 10, 2006

(54) JUICER AND GRATER ASSEMBLY

(75) Inventor: Jan-Hendrik de Groote, Brussels (BE)

(73) Assignee: Dart Industries Inc., Orlando, FL (US)

( * ) Notice: Subject to any disclaimer, the term of this patent is extended or adjusted under 35 U.S.C. 154(b) by 69 days.

(21) Appl. No.: 10/875,495

(22) Filed: Jun. 25, 2004

(65) Prior Publication Data

US 2005/0284309 A1    Dec. 29, 2005

(51) Int. Cl.
*A23N 1/00* (2006.01)
*A23L 1/00* (2006.01)
*A47J 19/02* (2006.01)

(52) U.S. Cl. .......................... 99/508; 99/506

(58) Field of Classification Search ................. 99/495, 99/501–508, 496, 497; 220/403, 4.21, 4.26, 220/625; 100/213, 208; D7/665, 678
See application file for complete search history.

(56) References Cited

U.S. PATENT DOCUMENTS

| | | | | |
|---|---|---|---|---|
| 344,506 | A * | 6/1886 | Strang | 99/505 |
| 2,801,658 | A | 8/1957 | Thomas | |
| 4,157,062 | A * | 6/1979 | Ackeret | 99/503 |
| 4,378,730 | A * | 4/1983 | Coggiola | 99/501 |
| D290,329 | S | 6/1987 | Bulto | |
| D307,090 | S | 4/1990 | De Coster | |
| 5,088,392 | A | 2/1992 | Ancona et al. | |
| 5,445,069 | A * | 8/1995 | Lucas et al. | 99/508 |
| 6,070,519 | A * | 6/2000 | Sham et al. | 99/348 |
| 6,135,018 | A * | 10/2000 | Yu et al. | 99/504 |
| D450,545 | S | 11/2001 | Au | D7/665 |
| D473,431 | S | 4/2003 | Schwamkrug | D7/665 |
| 6,539,848 | B1 * | 4/2003 | Wang et al. | 99/508 |
| D485,474 | S | 1/2004 | Wong | D7/665 |

* cited by examiner

*Primary Examiner*—Timothy F. Simone
(74) *Attorney, Agent, or Firm*—John A. Doninger

(57) ABSTRACT

The invention provides a juicer and grater assembly comprising an extractor having a plurality of radially extending tabs integral with a lower portion thereof, a combination grater and strainer having at least a plurality of first apertures and a plurality of second apertures, wherein the extractor is removably secured on the combination grater and strainer in either a first position wherein the plurality of radially extending tabs cover the plurality of first apertures for allowing extracted juice to flow through the plurality of second apertures, or in a second position wherein the plurality of radially extending tabs cover the plurality of second apertures allowing juice and pulp to flow through the plurality of first apertures.

14 Claims, 4 Drawing Sheets

JUICER AND GRATER ASSEMBLY

TECHNICAL FIELD

The present invention is directed toward a manually operated juicer, and more particularly, toward a juicer and grater assembly.

BACKGROUND OF THE INVENTION

Prior art manual juicers are commonly used to extract juice from cut citrus fruit. One problem associated with the prior art manual juicers is that they collect pulp and seed on a strainer around the juicer and allow only the juice to pass through to the reservoir below. Therefore, if juice with pulp is desired, a separate step or apparatus is required to collect juice with pulp.

Moreover, since graters are not commonly used everyday, if a user desires to grate or zest the outer layer or skin of the citrus fruit, he must use a separate grater, which requires purchase and storing an additional kitchen appliance.

It is therefore a primary object of the present invention to provide a manual juicer and grater assembly that will provide for both juice and juice with pulp when desired, and a grater for grating the outer layer or skin of citrus fruit.

SUMMARY OF THE INVENTION

These problems and others are addressed by the present invention which comprises a juicer and grater assembly having an extractor having a plurality of radially extending tabs integral with a lower portion thereof, a combination grater and strainer having at least a plurality of first apertures and a plurality of second apertures, wherein the extractor is removably secured on the combination grater and strainer in either a first position wherein the plurality of radially extending tabs cover the plurality of first apertures for allowing extracted juice to flow through the plurality of second apertures, or in a second position wherein the plurality of radially extending tabs cover the plurality of second apertures allowing juice and pulp to flow through the plurality of first apertures.

BRIEF DESCRIPTION OF DRAWINGS

These and other objects of the present invention will be appreciated and understood by those skilled in the art from the detailed description of the preferred embodiments of the invention and the following drawings of which.

DETAILED DESCRIPTION OF THE INVENTION

Figure 1:
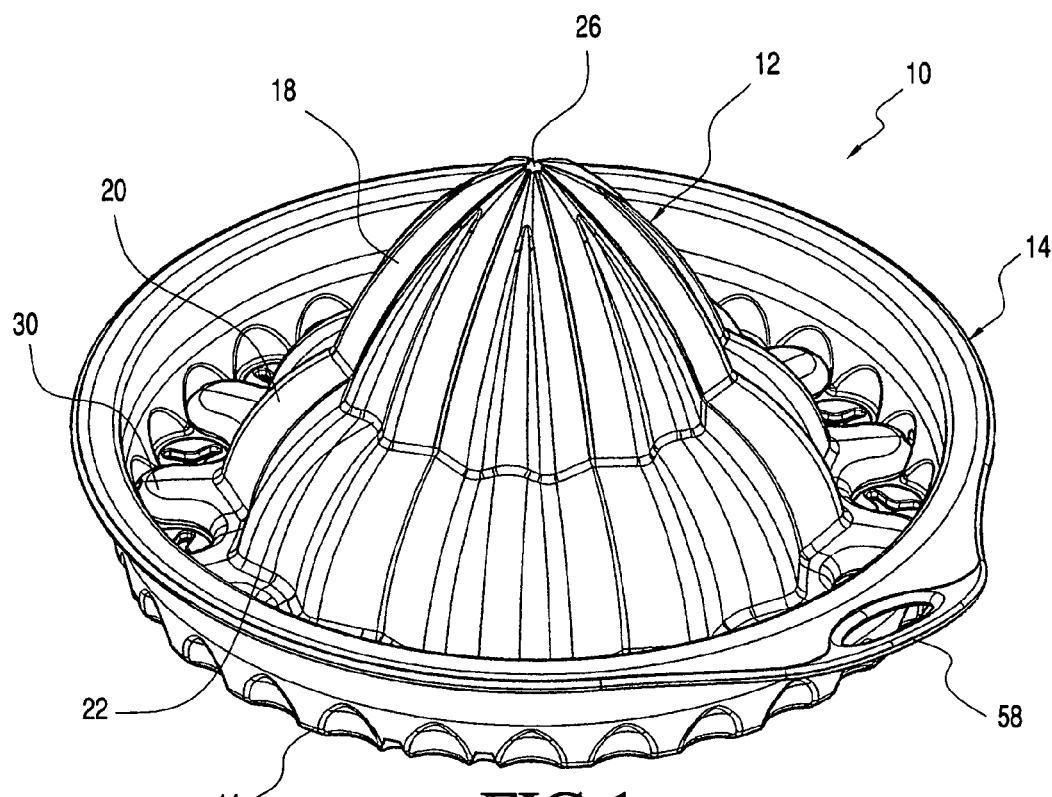
FIG. 1 is a top perspective view of the juicer and grater assembly according the present invention.

Referring now to the drawings, and more specifically FIG. 1, wherein the showings are for the purpose of illustrating the preferred embodiment of the invention only and not for the purpose of limiting the same, a juicer and grater assembly 10 is shown in an assembled configuration that includes an extractor 12 and a combination grater and strainer 14, wherein the extractor 12 is removably secured on the combination grater and strainer 14 in a locked position which prevents the rotation of the extractor 12 relative to the combination grater and strainer 14. Preferably, the extractor 12 and the combination grater and strainer 14 are molded of plastic material. It should be appreciated that the juicer and grater assembly 10 may be used with any juice reservoir or container (not shown) by placing the assembly on top of the juice reservoir opening.

Figure 3:
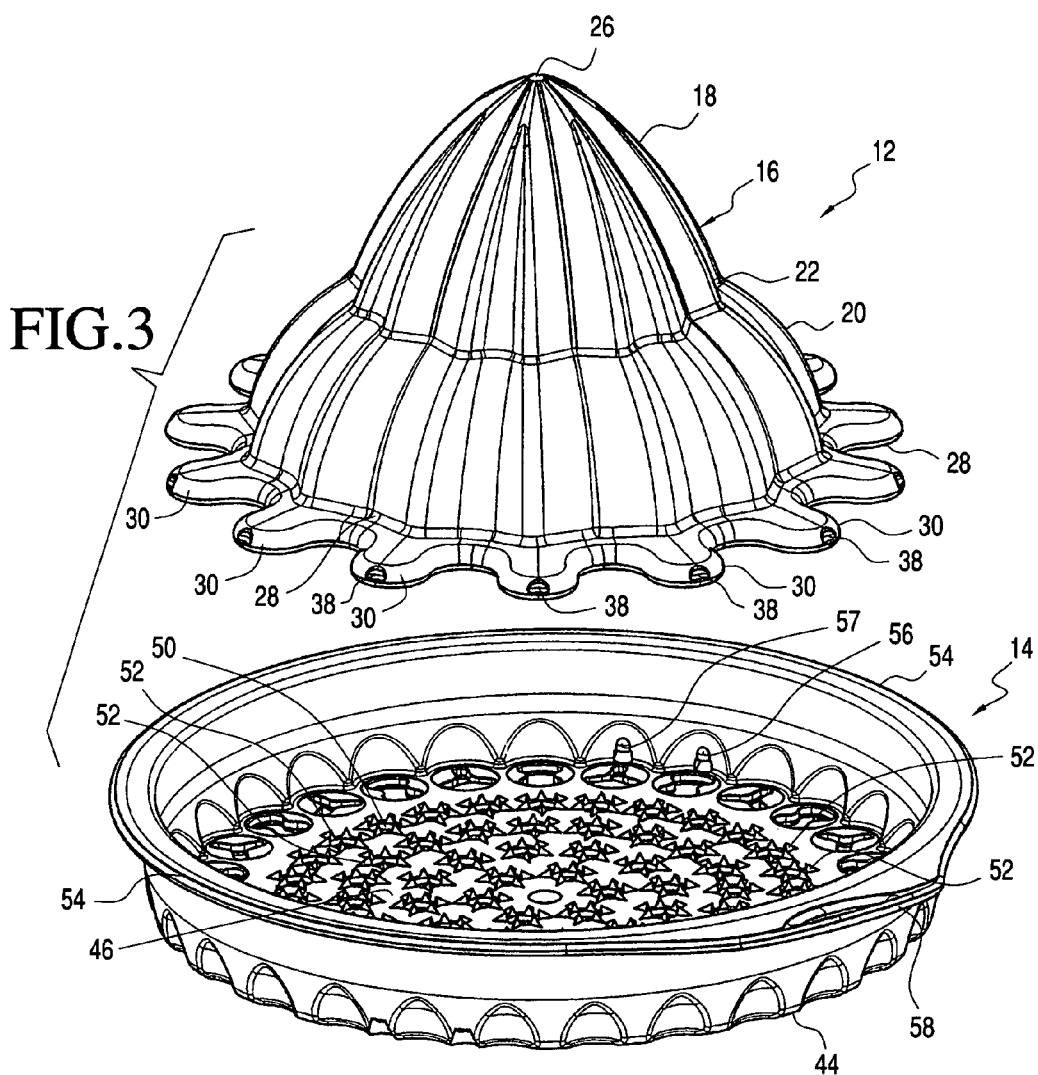
FIG. 3 is an exploded perspective view of the juicer and grater assembly.

Referring now to FIG. 3, the extractor 12 and the combination grater and strainer 14 are shown separated from each other. The extractor 12 includes a two-tiered upstanding cone 16 comprising an upper cone portion 18 integral with a lower portion 20 along a circumferential line 22. As will be explained in greater detail herein, the upper cone portion 18 can be used to extract juice from smaller citrus fruit such as lemon, and the lower portion 20 can be used to extract juice from larger citrus fruit such as orange. The two-tiered upstanding cone 16 further includes a plurality of longitudinal ridges 24 extending from an apex 26 to a lower periphery 28 of the lower portion 20.

Figure 6:
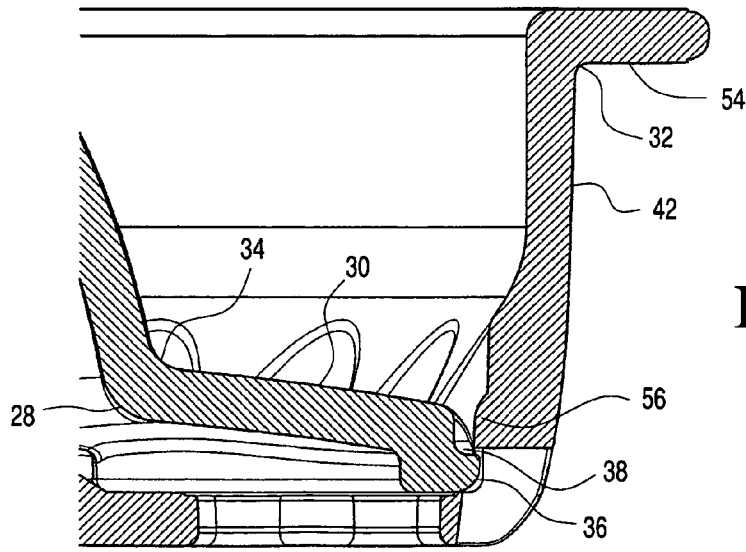

A plurality of radially extending tabs 30 are preferably integrally formed and extend outwardly from the lower periphery 28 of the lower portion 20. As best seen in FIG. 6, each radially extending tab 30 includes a proximal end 34 attached to the lower periphery 28 and a distal end 36 having a step or an indentation 38, which, as will be explained in greater detail, provides for a snap fit securing of the extractor 12 to the combination grater and juicer 14.

Figure 2:
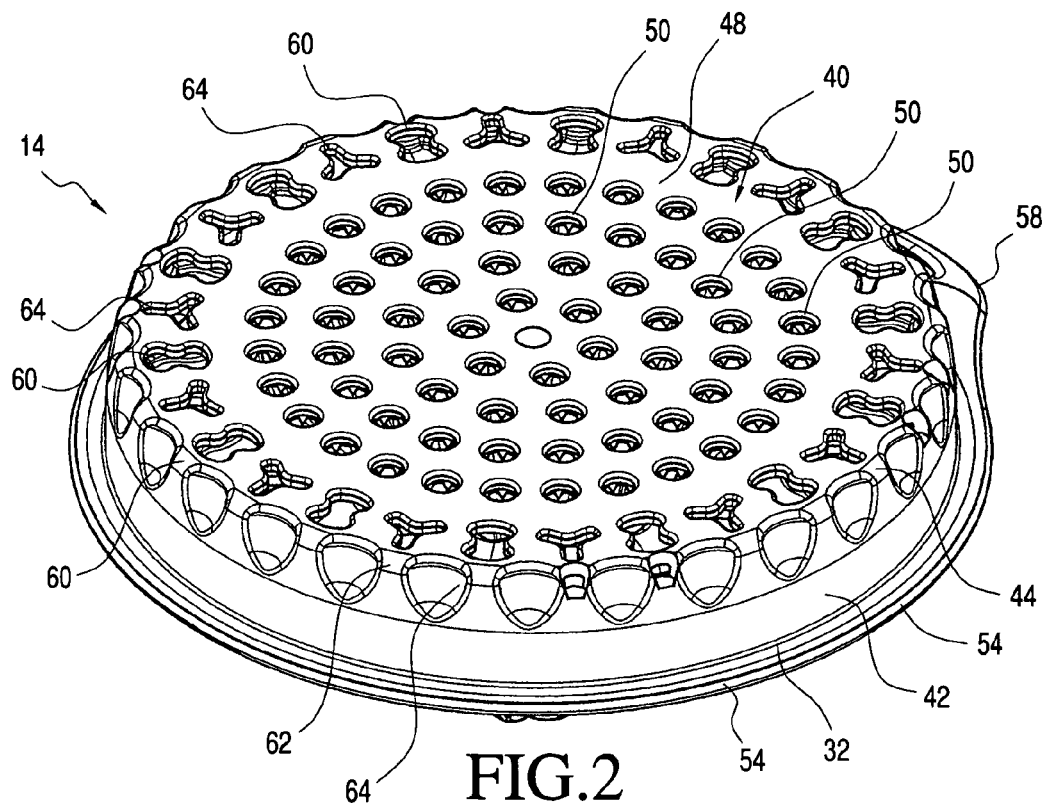
FIG. 2 is a bottom perspective view of the juicer and grater assembly according to FIG. 1.

Referring now to FIGS. 2 and 3, the combination grater and strainer 14 includes a substantially circular and flat base 40 bounded by an annular wall 42 integrally formed and extending upwardly from a peripheral edge 44 of the flat base 40. The flat base 40 further includes an upper surface 46 and a lower surface 48 wherein a plurality of substantially circular openings 50 are disposed thereon and extend from the upper surface 46 to the lower surface 48. The plurality of substantially circular openings 50 are preferably arrange in a concentric circular configuration of increasing diameter from the center of the flat base 40. A plurality of sharp cutters or perforations 52 are disposed on the upper surface 46 of the flat base 40 and around the perimeter of the each of the substantially circular openings 50, wherein the sharp cutters 52 allow for grating of the outer layer or skin of citrus fruit. The combination grater and strainer 14 may function as a grater or zester when it is not assembled with the extractor 12.

An annular flange 54 extends outwardly from the upper periphery 32 of the annular wall 42, and a grip portion tab 58 is integral with and extends beyond the annular flange 54. The combination grater and strainer further comprises a first protrusion 56 and a second protrusion 57 disposed on the upper surface 46 of the flat base 40 and adjacent the lower peripheral edge 44 of the annular wall 42. The first and second protrusions are dimensioned and configured to removable engage the indentation 38 of the extractor 12 thereby, as will be explained in greater detail, snap fit secure the extractor 12 with the combination grater and strainer 14.

Moreover, the combination grater and strainer 14 includes a first plurality of substantially peanut-shaped apertures 60 disposed on and around the perimeter of the flat base 40 and adjacent the peripheral edge 44, in alternating configuration relative to a second plurality of substantially Y-shaped apertures 64 also disposed on the flat base 40 and adjacent the peripheral edge 44. It should be appreciated that the plurality of peanut-shaped apertures 60 and the plurality of Y-shaped apertures 64 may have other shapes and configurations without departing form the spirit of the invention, which is to provide two sets of varying sized apertures. As will be explained herein, each peanut-shaped aperture 60 has a larger dimension than that of the Y-shaped aperture, therefore allowing for the passage of pulp and juice therethrough, wherein each Y-shaped aperture is dimensioned to prevent the passage of pulp therethrough.

Figure 4:
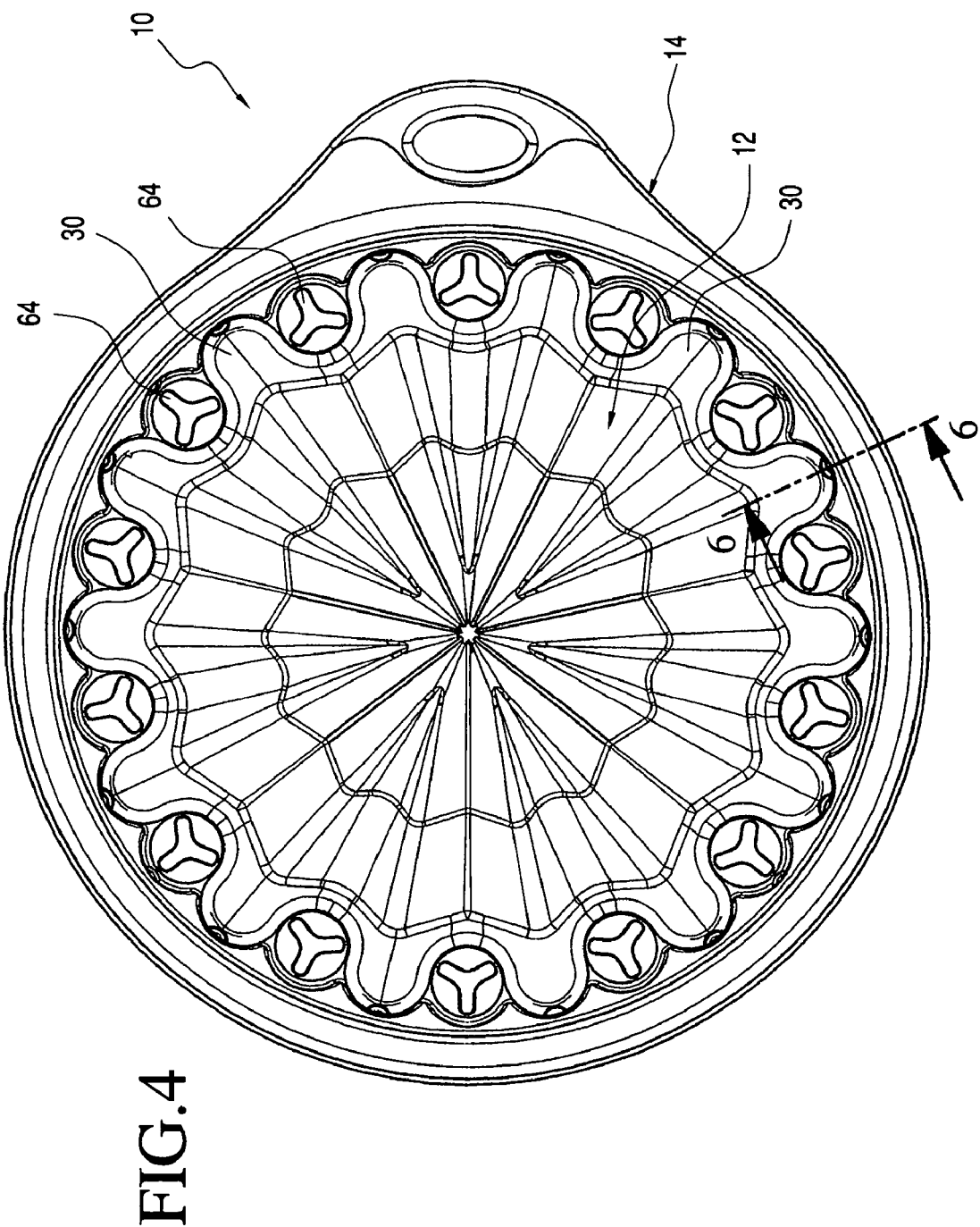
FIG. 4 is a top plan view of the juicer and grater assembly of FIG. 1 in a juice only position.
Figure 5:
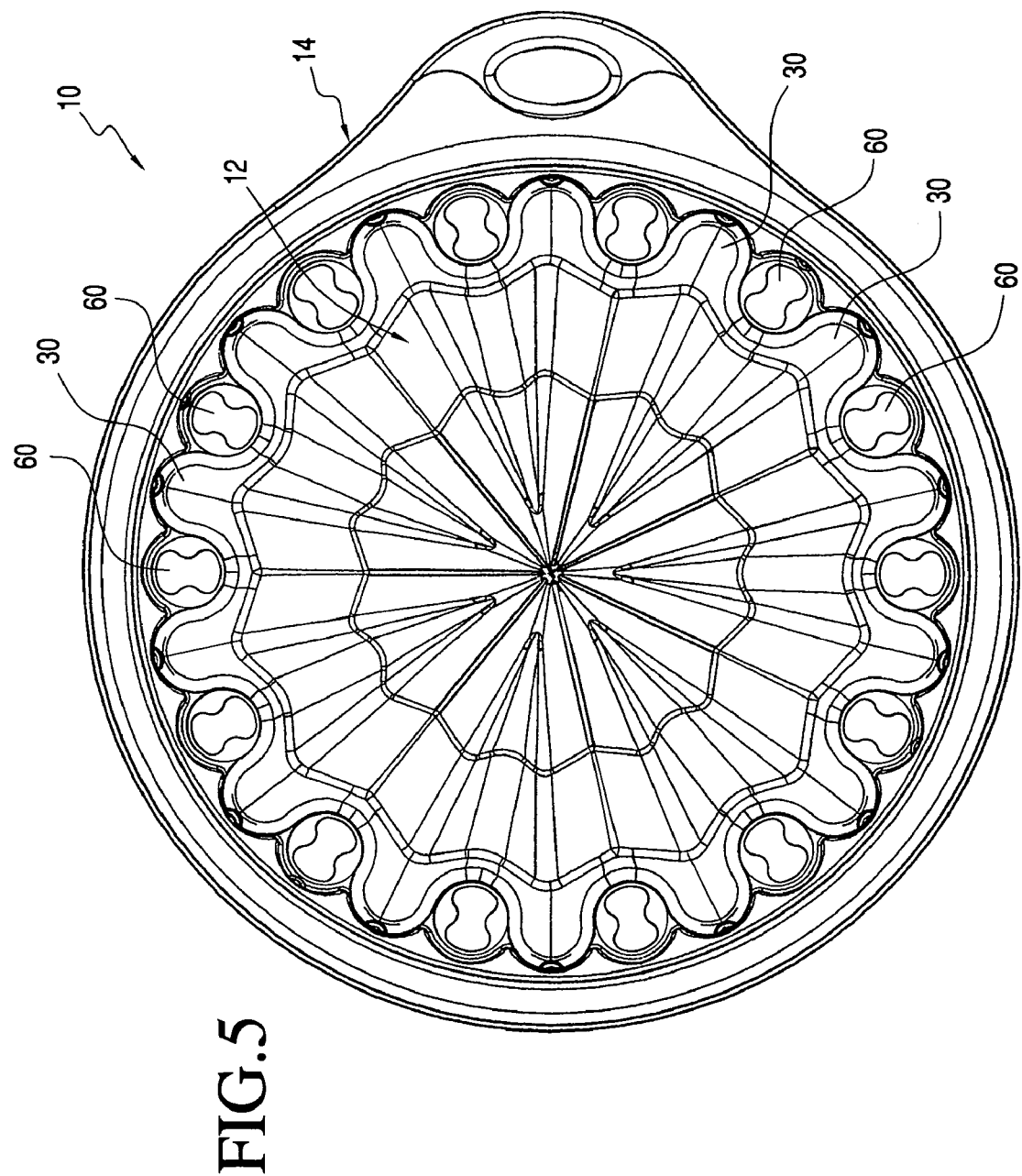
FIG. 5 is a top plan view of the juicer and grater assembly of FIG. 1 in a juice and pulp position; and, FIG. 6 is a side sectional view of the juicer and grater assembly and taken along line 6—6 of FIG. 4.

The extractor 12 and the combination juicer and grater 14 are assembled in two positions: a first juice position, as best seen in FIG. 4, and a second juice and pulp position, as best seen in FIG. 5. To assemble the juicer and grater assembly 10 in the first juice position, the extractor 12 is placed on the upper surface 46 of the circular flat base 40 and slightly pressed down so that the indentation 38 of one of the plurality of radial tabs 30 engages the first protrusion 56, which is disposed at the periphery of one of the peanut-shaped apertures 60. The remaining radial tabs 30 also cover a corresponding peanut-shaped aperture 60, and because the plurality of radial tabs 30 are formed along the lower periphery 28 of the lower portion 20 in an alternating configuration, the Y-shaped apertures 64 become exposed and allow the extracted juice to flow to the reservoir below and holding the pulp on the upper surface 46 of the base 40. Similarly, to assemble the juicer and grater assembly 10 in the second juice and pulp position, the extractor 12 is placed on the upper surface 46 of the flat base 40 and slightly pressed down so that the indentation 38 of one of the plurality of radial tabs 30 engages the second protrusion 57, which is disposed at the periphery of one of the Y-shaped apertures 64. The remaining radial tabs 30 cover a corresponding Y-shaped aperture 60, and because the plurality of radial tabs 30 are integrally formed with the lower periphery 28 of the lower portion in an alternating configuration, the peanut-shaped apertures 60 become exposed and allow the extracted juice together with pulp to flow to the reservoir below.

While preferred embodiments of the invention have been shown and described, various modifications and substitutions may be made thereto without departing from the spirit and scope of the invention. Accordingly, it is to be understood that the present invention has been described by way of illustration only, and this description should not be construed as limiting to the several claims appended hereto.

What is claimed is:

1. A juicer and grater assembly, comprising:
   an extractor having at least one radially extending tab,
   a strainer having at least a first aperture and at least a second aperture, wherein said at least a first aperture is configured and dimensioned to be larger than said at least a second aperture, wherein said extractor is removably secured on said strainer in either a first position wherein said at least one radially extending tab covers said at least a first aperture for allowing extracted juice to flow through said at least a second aperture, or in a second position wherein said at least radially extending tab covers said at least a second aperture allowing juice and pulp to flow through said at least a first aperture.

2. The juicer and grater assembly of claim 1 wherein said at least a first aperture is a plurality of first apertures.

3. The juicer and grater assembly of claim 1 wherein said at least a second aperture is a plurality of second apertures.

4. The juicer and grater assembly of claim 1 wherein said extractor comprises a two-tiered upstanding cone having an upper cone portion and a lower portion integral with the upper cone portion.

5. The juicer and grater assembly of claim 1 wherein said at least one radially extending tab is a plurality of radially extending tabs in an alternating configuration integral with a lower periphery of said second portion.

6. The juicer and grater assembly of claim 4 wherein said extractor comprises a plurality of longitudinal ridges extending from an apex of the said upper cone portion to a lower periphery of said lower portion.

7. The juicer and grater assembly of claim 1 wherein said a least one radially extending tab includes an indentation at a distal end thereof.

8. The juicer and grater assembly of claim 7 wherein said strainer further comprises a base having an upper surface and a lower surface, and at least two protrusions disposed on said upper surface and dimensioned and configured to engage said indentation on said radially extending tab.

9. The juicer and grater assembly of claim 8 wherein said extractor is removable snap fit secured to said strainer.

10. The juicer and grater assembly of claim 8 wherein said strainer comprises a plurality of substantially circular apertures on said flat base extending from said upper surface to said lower surface.

11. The juicer and grater assembly of claim 10 wherein said strainer comprises a plurality of sharp cutters disposed on said upper surface of said flat base and encircling each of said plurality of circular apertures, thereby said strainer may function as a grater.

12. The juicer and grater assembly of claim 1 wherein said at least a first aperture is peanut-shaped.

13. The juicer and grater assembly of claim 1 wherein said at least second aperture is Y-shaped.

14. The juicer and grater assembly of claim 11 wherein said plurality of first apertures are disposed in an alternating configuration relative to said plurality of said second apertures on said upper surface of said flat base.

* * * * *